Feb. 5, 1957    A. SENKOWSKI ET AL    2,780,159
OVERLOAD RELEASE ARRANGEMENT FOR LONG IMPLEMENTS
Filed April 19, 1954    4 Sheets-Sheet 3
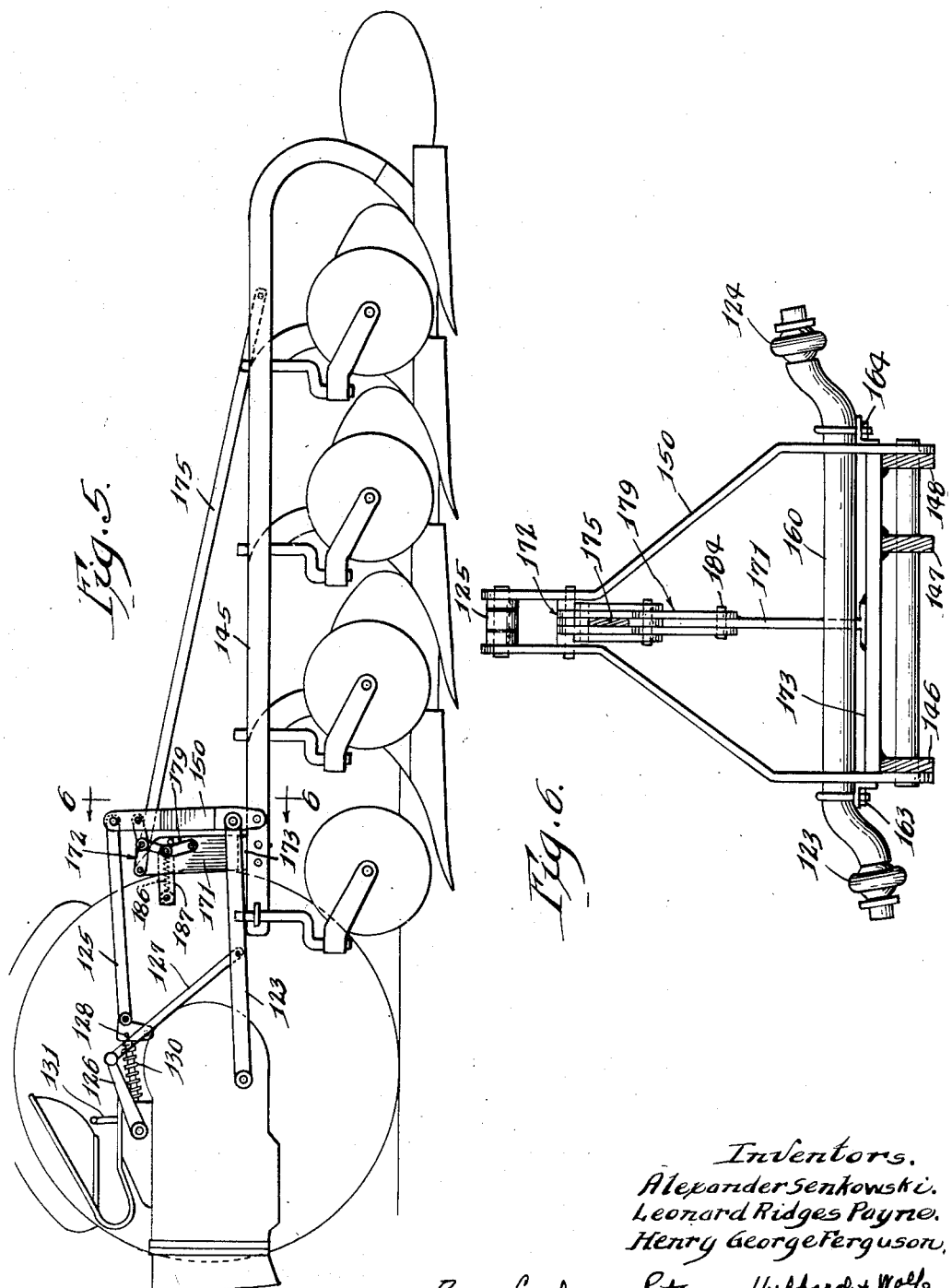
Inventors.
Alexander Senkowski.
Leonard Ridges Payne.
Henry George Ferguson,
By. Carlson, Pitzner, Hubbard + Wolfe
Attorneys.

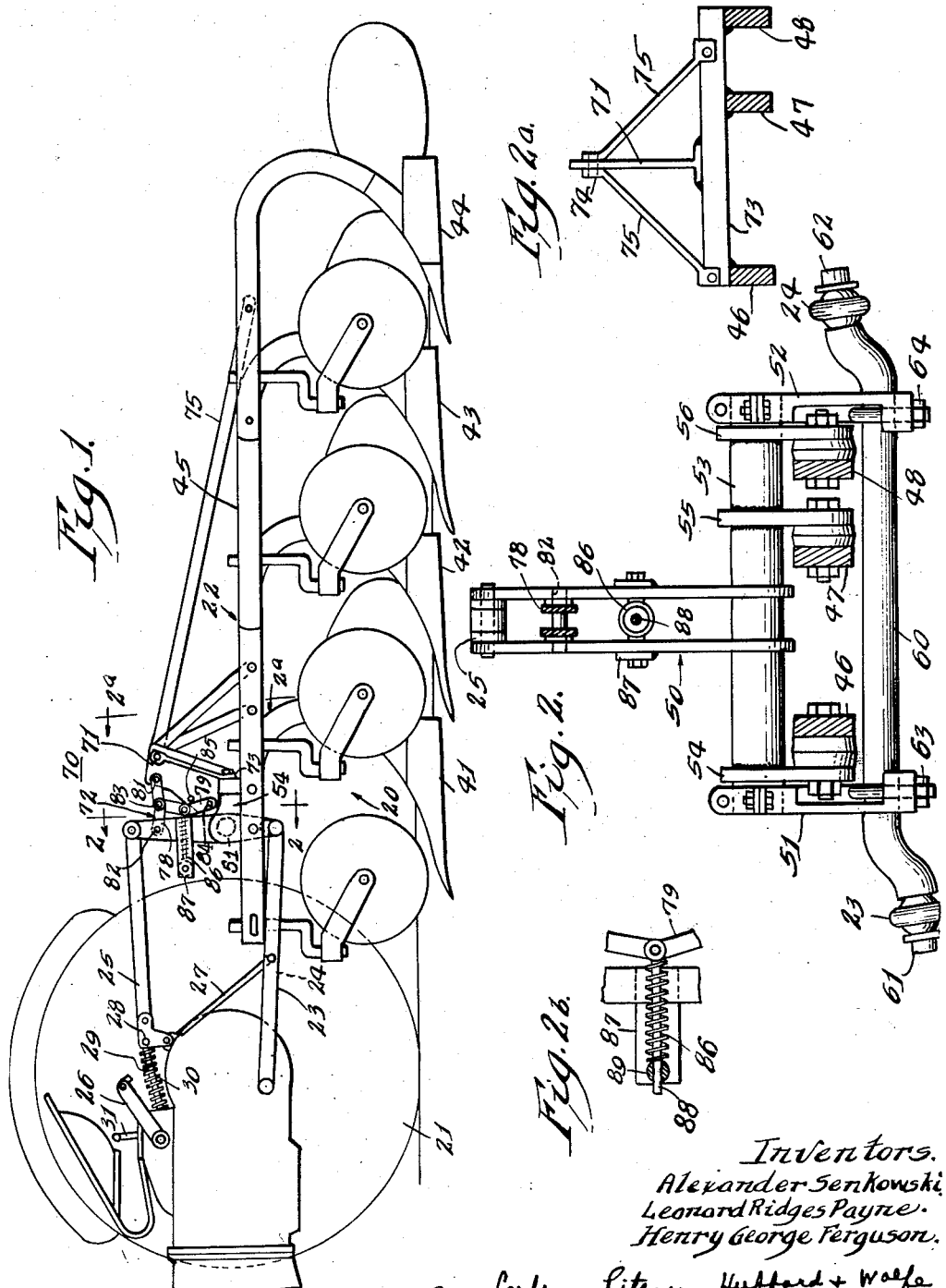

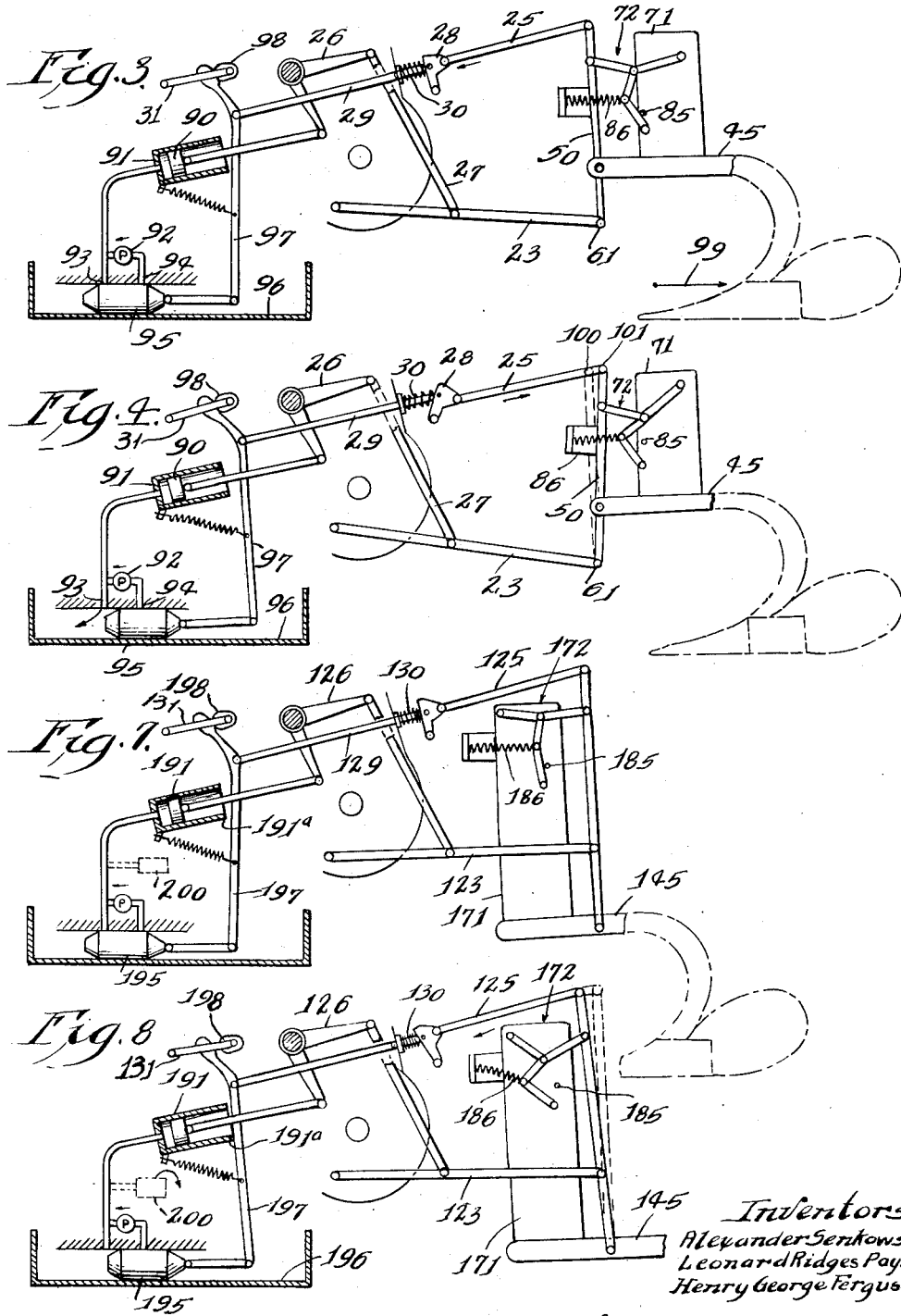

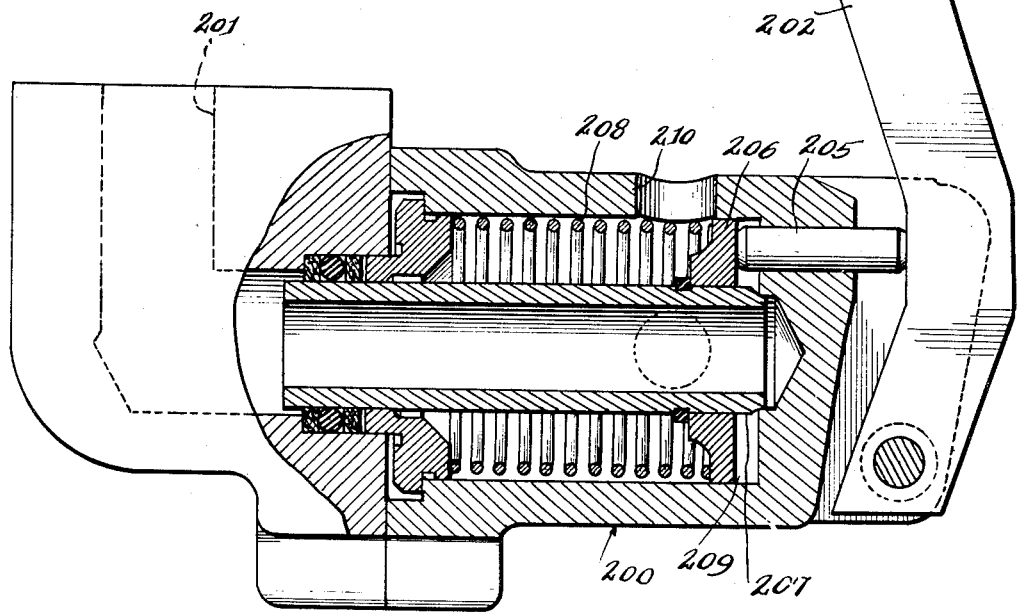
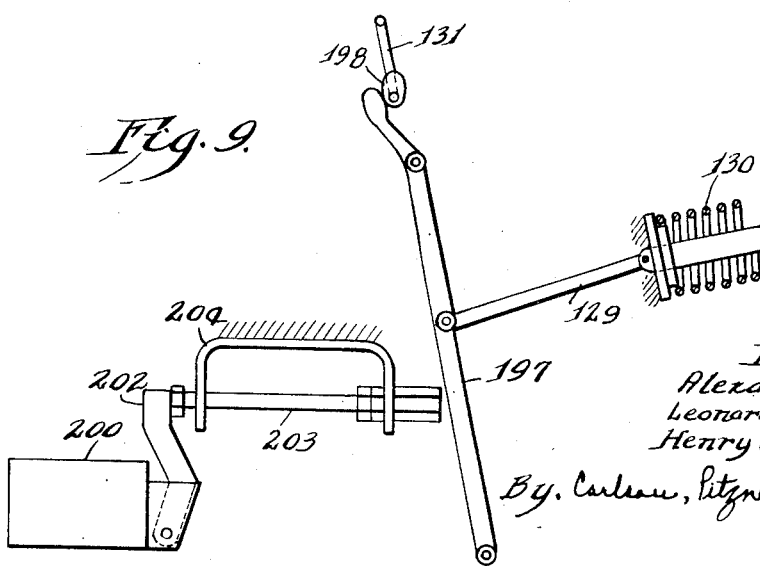

United States Patent Office 2,780,159
Patented Feb. 5, 1957

2,780,159
OVERLOAD RELEASE ARRANGEMENT FOR LONG IMPLEMENTS

Alexander Senkowski, Earlsdon, Coventry, Leonard R. Payne, Yardley, Birmingham, and Henry George Ferguson, Abbotswood, Stow-on-the-Wold, England, assignors to Massey-Harris-Ferguson (Sales) Limited, Coventry, England, a British company Application April 19, 1954, Serial No. 424,136

Claims priority, application Great Britain April 21, 1953

6 Claims. (Cl. 97—46.07)

The present invention relates to load-transferring tractor hitches, and more particularly to an arrangement for releasing the load from the tractor rear wheels upon striking an obstruction.

It is an object of the present invention to provide an improved load-transferring hitch mechanism which causes the load to be released under overload conditions, even in the case of implements which are so long and tail-heavy as to make conventional overload release devices inoperative. It is a more specific object to provide a load-transferring hitch mechanism which is particularly suitable for use with gang plows which extend far beyond the rear end of the tractor and which is capable of releasing the load from the tractor rear wheels even though one or more of the plow bottoms may be caught under an obstruction.

It is another object of the invention to provide a hitch mechanism having a novel linkage arrangement which is rigid under normal operating conditions, but which collapses upon being subjected to predetermined overload, for immediate and positive unloading of the tractor rear wheels. It is a further object to provide a hitch mechanism of the unloading type which resets itself automatically upon removal of overload incident to backing up the tractor. Finally, it is an obejct to provide a release mechanism which offers positive protection against overload, which may be used with various implements, and which is simple and inexpensive to manufacture and install.

Other objects and advantages of the invention will become apparent upon reading the attached detailed description and upon reference to the drawings, in which Figure 1 is a side elevation of a tractor hitch constructed in accordance with the present invention and used for coupling a four-bottom plow to a tractor of conventional design.

Fig. 2 is a section taken along the line 2—2 in Fig. 1.

Fig. 2a is a fragmentary section taken along the line 2a—2a in Fig. 1.

Fig. 2b is a fragment showing the mounting of the toggle spring employed in Figs. 1 and 2.

Fig. 3 is a diagram showing the mechanism of Fig. 1 under normal running conditions.

Fig. 4 is a diagram similar to Fig. 3, but showing the releasing action which occurs under overload conditions.

Fig. 5 is a side elevation of a modified form of hitch constructed in accordance with the present invention.

Fig. 6 is a section taken along the line 6—6 in Fig. 5.

Fig. 7 is a diagram showing the mechanism of Fig. 5 under normal plowing conditions.

Fig. 8 is similar to Fig. 7, but shows release under overload conditions.

Fig. 9 shows a dumping valve which may be employed in connection with the arrangement discolsed in Figs. 5–8, inclusive.

Fig. 10 is an enlarged longitudinal section of the dumping valve shown in Fig. 9.

While the invention has been described in connection with two separate embodiments, it will be understood that the embodiments are simply exemplary and that the invention is not limited thereto, and that we intend to cover all modifications and alternative constructions falling within the spirit and scope of the appended claims.

Turning to the drawings, Figure 1 shows a hitch mechanism indicated generally at 20 for coupling a tractor 21 to an implement 22. While only the rear end of the tractor has been shown, it will be recognized by one skilled in the art as a well known Ferguson tractor employing a pair of draft links 23, 24 laterally spaced from one another, and a top link 25. For the purpose of raising and lowering the draft link 23, a lift arm 26 is provided having a drop link 27. Mounted at the forward end of the top link 25 is a bell crank 28. To the latter is connected a control rod 29 which is outwardly biased by a control spring 30.

As will be understood by one skilled in the art, a hydraulic lift mechanism is included within the rear housing of the tractor so arranged that inward movement of the control rod against the force of the spring 30 causes raising of the draft links to provide depth control under normal operating conditions, the equilibrium depth being established by the setting of a manual quadrant lever 31. Outward movement of the control rod from the equilibrium position brings about a lowering of the draft links. Means are further provided for releasing the draft links, i. e., allowing them to drop when the control rod 29 is moved in a forward direction beyond its normal range of movement, due to excessive inward movement incident to overload. The releasing of the lower links under overload conditions removes the weight of the implement from the tractor, thereby permitting the tractor wheels to spin harmlessly and preventing damage to the mechanism.

For the details of construction of the hydraulic system, cross reference is made to Ferguson Patents 2,118,180 and 2,118,181. More detailed reference will be made to the hydraulic system in connection with Figs. 3, 4, 7 and 8, which are intended to bring out the operation of the present device under overload conditions.

Turning attention next to the implement 22, it will be recognized as a gang plow having bottoms 41–44, inclusive, connected to a frame 45 having longitudinal members or beams 46, 47, 48. The plows are arranged in the usual echelon formation and the frame members 46–48 may be laterally braced wtih respect to one another to the extent desired. It will suffice to say that all of the plows form a rigid unit with the longitudinal frame 45.

For the purpose of pivotally connecting the implement frame 45 to the trailing ends of the tractor links, a vertical member or A-frame 50 is provided, as shown in Fig. 2. Such A-frame includes two side members 51, 52 and a relatively massive cross shaft 53 having hangers 54—56 for pivotally anchoring the beams of the plow frame. Arranged below the cross shaft 53 is a drawbar 60 having cranked ends or pivots 61, 62 for engaging the trailing ends of the draft links 23, 24. The drawbar 60 is clamped in an adjusted position relative to the A-frame by means of clamps 63, 64. In carrying out the invention the frame 45 of the implement is anchored to the vertical member or A-frame 50 at a point which is vertically offset from the line of connection of the tractor draft links, so that the implement tends to produce a torque about the lower draft links as a fulcrum. In the present embodiment, the beams of the implements frame are connected to the A-frame at a point substantially above the line of connection of the draft links, as shown in Fig. 2.

In accordance with the present invention, a collapsible brace is provided between the implement frame 45 and the vertical member 50. Such brace is so arranged that the vertical member and implement frame are rigidly connected together for slight rocking movement, as a unit, under normal operating conditions, but is adapted to collapse under overload, causing the torque exerted by the implement to be effective to move the upper link beyond its normal range of movement. One familiar with the hydraulic system of the tractor will appreciate that this results in unloading of the tractor rear wheels so that the wheels may spin relative to the ground to relieve the overload condition.

Turning specifically to the embodiment shown in Figure 1, the collapsible brace, indicated at 70, includes a vertical brace plate 71 on the implement frame and a compound toggle linkage 72, which is interposed between the brace plate and the vertical member or A-frame 50. The brace plate 71 is mounted on a cross member 73, which is suitably secured to the beams 46—48 of the implement frame (Fig. 2a). For the purpose of rigidifying the brace plate 71, an anchor point 74 is provided at its upper end for connecting suitable struts or tie members 75.

Turning in greater detail to the compound toggle linkage 72, it will be seen that it includes a first toggle 78 and a second toggle 79. The first toggle consists of two links pivoted together at the center and extending more or less horizontally between a pivot 81 on the brace plate 71 and a pivot 82 on the A-frame 50. The second toggle 79 is vertically arranged, having one end connected to the center pivot 83 of the first toggle and having the other end pivotally supported on the brace plate at a pivot 84. The toggle 79 is blocked in a near dead-center position by a stop 85 on the brace plate. The links of the toggles are proportioned so that the toggle 78 is also in a near dead-center position under normal operating conditions. A spring 86 is employed to bias the second toggle against its stop 85, the spring being anchored on the A-frame by a suitable bracket 87. The spring is telescoped over a central guide rod 88, which is slidably mounted in an adjustable stop member 89 at the forward end of the bracket, as shown in Fig. 2b. Because of the action of the compound toggle in which both of the toggle elements are in a near dead-center position, the implement frame 45 and the vertical member or A-frame 50 form a rigid unit to provide conventional depth control under normal plowing conditions.

To understand the operation of the device under normal conditions, reference is made to Fig. 3, which is a diagrammatic showing of the hitch and associated hydraulic system. The hydraulic system within the tractor is known to one skilled in the art, so that a brief description will suffice. The lift arm 26 connected to the draft link 23 is actuated by a ram 90 in a cylinder 91. The cylinder is hydraulically connected to a pump 92 and a valve port 93. The intake side of the pump is connected to a port 94, both the ports being covered by a valve plunger 95, moving endwise in a sump 96. For the purpose of operating the valve plunger 95, a floating lever 97 is provided which is connected at an intermediate point to the control rod 29, and which bears against a cam 98, positioned by the quadrant lever 31.

With the compound toggle in the locked position shown in Fig. 3, the implement frame 45 forms a rigid unit with the vertical member 50 which serves to convert the ground reaction, indicated at 99, into forward pressure on the top link 25. The operation of the device in this condition is conventional. Any increase in ground reaction causes leftward movement of the valve plunger, resulting in the supplying of pressurized fluid to the cylinder 91, tending to raise the implement. Any decrease in ground reaction has the opposite effect, tending to move the valve plunger to the right, thereby uncovering the port 93 and exhausting or dumping the fluid from the cylinder 91. When this occurs the draft links are released to fall under the force of gravity and implement "suck," until equilibrium is reestablished. Only a small amount of movement of the top link is effective to develop full pressure in the cylinder 91, and the link therefore moves through only a limited range under normal operating conditions. It will be appreciated that under normal conditions the linkage transfers the suck and weight of the implement to the tractor rear wheels in order to increase the traction at the rear wheels, the latter being referred to as "load transfer".

The operation of the device under overload, as shown in Fig. 4, may best be illustrated by assuming that the rear plow of the gang has caught upon an obstruction, such as a buried stump, which prevents the implement frame from rocking forwardly a sufficient amount to actuate the normal overload release. Under such circumstances the sudden heavy horizontal load on the implement frame produces a clockwise torque about the line of connection of the lower draft links. Excessive torque tends to compress the compound toggle linkage 72 beyond its yield point and the toggle linkage therefore collapses, as shown in Fig. 4, compressing the spring 86. The compound toggle has a rapidly falling force characteristic so that once the breaking away point is reached, the toggle mechanism fully collapses so that the bracing effect is removed and the vertical member 50 is free to rotate clockwise from the normal position indicated at 100 to the position 101, which draws the top link 25 rearwardly.

This rotates the floating lever 97 counterclockwise, causing the valve plunger to be drawn far to the right, thereby dumping the oil in the cylinder 91 and releasing the draft links. With the draft links released, there is no effective connection between the implement and the tractor for transfer of vertical loading. Thus, the tractor wheels are free to spin idly and breakage of any part due to overload is avoided. The linkage remains collapsed until the operator backs the tractor to disengage the plow from the obstruction. Thereupon, the spring 86, acting upon the compound toggle, serves to restore the toggle to normal condition illustrated in Fig. 3, so that plowing may continue without the operator having to dismount. The degree of overload required to collapse the compound toggle may be precisely adjusted by prestressing the spring a desired amount, which can be readily accomplished by moving the stop 89 backwardly or forwardly on the bracket 87. The calibration may also be varied by moving the stop 85, which has the effect of moving the normal operating point upwardly or downwardly on the force curve. The normal position of the toggle should be just short of the dead-center position, although setting the exact margin is a matter which is well within the skill of the art.

In the embodiment of the invention described above, the parts are arranged so that overload produces rearward movement of the top link. It will be apparent, however, that the invention is not limited thereto, and if desired the direction of the torque produced in the vertical member may be reversed by connecting the implement at a point below the line of connection of the tractor draft links, so that overload produces excessive forward movement of the top link 25, thereby to operate the overload release included in the conventional tractor hydraulic system. Such an arrangement is disclosed in the remainder of the figures. Because of the similarity of the two embodiments, corresponding reference numerals, increased by 100, have been used to indicate corresponding parts.

Referring to Figs. 5 and 6, a modified A-frame construction 150 is used, which engages the longitudinal beams 146—148 below the line of connection of the draft links 123, 124. The brace plate 171 is located on the forward portion of the implement frame 145 ahead of the A-frame 150, the compound toggle 172 being interposed between the brace plate 171 and the A-frame 150, to resist forward rocking movement of the A-frame. The toggle spring 186 corresponds to the spring 86 employed in the previous embodiment and the function is exactly the same. The only difference in construction is that the bracket 187 is anchored at its rear end to the brace plate 171, rather than to the A-frame 150.

With the toggle in its normal or locked position, and with the tractor proceeding in the normal fashion, the parts occupy the positions set forth diagrammatically in Fig. 7. Just as in the case of the previous embodiment shown in Fig. 3, the implement frame and the vertical member or A-frame are locked together as a rigid unit under normal plowing conditions, and the operation of the hydraulic system to establish depth control is exactly the same.

However, upon striking a submerged obstacle, the force exerted upon the compound toggle becomes greater than that for which the spring 186 has been set. This causes positive collapsing movement of the toggle so that the A-frame is no longer vertically braced relative to the implement frame. Consequently, the implement frame acts to apply torque about the trailing ends of the draft links considered as a fulcrum, which torque results in extreme forward movement of the top link 125 against the force of the biasing spring 130. Such forward movement causes the floating lever 197 to move forwardly, away from the cam 198, until the floating lever strikes an abutment 191a on the cylinder 191. Additional movement of the upper link, with the abutment as a fulcrum, causes the valve plunger 195 to move rearwardly into the position shown in Fig. 8, thereby dumping the oil in the cylinder 191 and releasing the draft links. With the draft links released, the force-transferring connection between the implement and tractor is broken and the tractor wheels are thus free to spin idly until the condition causing the overload is corrected.

While the arrangement shown in Figs. 5–8 produces a satisfactory overload release, nevertheless it may be desirable under some circumstances to dump the oil in the cyinder 191 more rapidly than is possible by movement of the valve plunger 195 in the regular control valve. It may also be desirable to provide means in the hydraulic system which will prevent substantial pressure from being reapplied to the cylinder 191 until the overload condition has been entirely cleared. For this purpose, a dumping valve 200 may be used having an inlet port 201 which is connected in the hydraulic system, as shown in Figs. 7 and 8 adjacent the cylinder 191. Such dumping valve is constructed in accordance with the teachings of Bunting application Ser. 256,112, filed November 13, 1951, now Patent No. 2,707,612, to which cross reference is made. The following brief description will suffice.

The valve 200 has an operating arm 202, which is connected to a plunger 203 slidably mounted in a bracket 204, the plunger being arranged in the path of movement of the floating lever 197 (Fig. 9). Mounted near the fulcrum of the arm 202 is a tripping plunger 205, which bears against a piston 206 which is mounted on a hollow piston shaft 207. The piston and piston shaft are urged to the right (as shown in Fig. 10) by an adjustable spring 208. With the piston shaft pressed to the right, the pressurized oil entering at 201 cannot escape. However, upon inward movement of the tripping plunger 205, the piston 206 and piston shaft 207 are moved to the left, resulting in escape of the oil into the space 209. Since the piston has substantial area, this results in immediate leftward movement of the piston against the force of the spring 208, resulting in the uncovering of an escape port 210 connected to the sump.

Once the dumping valve is triggered, operation is immediate and the pressure on the main ram is reduced to a negligible value without delay. Furthermore, even a low value of oil pressure, acting on the piston 206, is sufficient to keep the dumping valve open until the overload condition has been completely corrected by the operator. This prevents any periodic hunting or bucking which might otherwise occur.

In describing both of the above arrangements, it has been assumed that the rearmost plow was hooked under an obstruction, thus preventing the forward rocking movement of the implement frame, which rocking is depended upon in the case of simpler implements to accomplish release under overload conditions. This represents a rather extreme condition, and it will be understood that the operation is equally advantageous, even where the plows do not actually hook under an obstruction, but simply encounter a patch of ground where the going is especially hard. Referring, for example, to Figure 1, it will be noted that the length of the implement, between the point of connection to the draft links and the last plow in the series, is approximately four times as great as the vertical distance between the draft links and the top link. In conventional tractors of the type described herein, substantial inward movement of the top link is required to operate the overload release mechanism. Because of the length of the implement, it will be appreciated that the rear plow would be required to move vertically a distance which is about four times that of the required actuation distance of the top link. It has been found that in practice movements of this magnitude are simply not obtainable regardless of the type of obstruction which may be encountered by the last or second last plow bottom. As a result, the conventional system cannot be depended upon to produce positive overload release. By contrast, in either one of the present embodiments, operation of the overload release is dependent upon only one factor, the horizontal force in the implement frame, and this is largely independent of the type of obstruction. Thus, reliable operation is assured, and the danger of breakage, either of the implement or of a tractor part, is avoided.

It will be apparent that both of the arrangements described above are extremely simple and may be manufactured economically. While the invention has been described in connection with a four-bottom plow, it may be readily seen that the invention is not limited thereto, but is applicable to all "heavy draft" soil-engaging implements which are longer or more tail-heavy than the implements for which the tractor hydraulic system was originally intended.

We claim as our invention:

1. A tractor hitch for use with a tractor comprising a pair of trailing draft links and a power lift mechanism for the draft links, said power lift mechanism including a spring-biased top link together with means for elevating the draft links in accordance with inward movement of the top link and for lowering the draft links when the top link is moved rearwardly, a vertical member having its top portion adapted for connection to said top link and having its lower portion adapted for pivoting to said draft links, an implement frame pivotally connected to said vertical member, bracing means interconnecting the implement frame and the vertical member for preventing relative pivoting movement between them under normal operating conditions, said bracing means including a collapsible element arranged to collapse when subjected to predetermined bracing pressure, said implement frame being connected to said vertical member above the line of connection of said draft links so that exceeding a predetermined draft force causes collapsing of said bracing means and resultant rearward movement of the top link for conditioning the power lift mechanism for lowering the draft links thereby releasing the load on the tractor rear wheels.

2. A load-transferring hitch for connecting an implement frame with a tractor comprising a pair of trailing draft links and a power lift mechanism for the draft links, which power lift mechanism includes a spring-biased top link, together with means for elevating the draft links in accordance with inward movement of the top link and for lowering the draft links in accordance with outward movement of the top link, a vertical member having its top portion adapted for connection to said top link and its lower portion adapted for pivoting to said draft links, means pivotally connecting said vertical member to the implement frame at a point offset from the line of connection of said lower links so that torque is applied to said vertical member about its pivotal connection to the frame as a result of the draft force applied through the draft links, bracing means interconnecting the implement frame and the vertical member for opposing the torque exerted on the member so that the top link is moved inwardly in proportion to the draft force, said bracing means having a member which is rigid in the face of normal operating forces but which is collapsible when subjected to greater than normal force, the collapse of said bracing means allowing the torque exerted on the member to rock the vertical member for movement of the top link outwardly and resulting in the lowering of the draft links and lightening of the load on the tractor rear wheels.

3. A load-transferring hitch for connecting an implement frame with a tractor comprising a pair of trailing draft links and a power lift mechanism for the draft links, which power lift mechanism includes a spring-biased top link together with means for elevating the draft links in accordance with inward movement of the top link and for lowering the draft links in accordance with outward movement of the top link, a vertical member having its top portion adapted for connection to said top link and its lower portion adapted for pivoting to said draft links, means pivotally connecting said vertical member to the implement frame at a point offset from the line of connection of said lower links so that torque is applied to said vertical member about the pivots on said draft links as a result of the draft force applied through the draft links, bracing means interconnecting the implement frame and the vertical member for opposing the torque exerted on the member so that the top link is moved inwardly in proportion to the draft force, said bracing means including a toggle linkage spring biased to a near dead center position to provide rigid bracing in the face of normal operating force, but which collapses when subjected to greater than normal force and allows the torque exerted on the member to move the top link outwardly resulting in lowering of the draft links and lightening of the load on the tractor rear wheels.

4. A load-transferring hitch for connecting an implement frame with a tractor comprising a pair of trailing draft links and a power lift mechanism for the draft links, which power lift mechanism includes a spring-biased top link together with means for elevating the draft links in accordance with inward movement of the top link and for lowering the draft links in accordance with outward movement of the top link, a vertical member adapted for pivoted connection to the rear ends of said links, means pivotally connecting said vertical member to the implement frame at a point vertically offset from the line of connection of said draft links so that torque is applied to said vertical member about the connection with the frame as a fulcrum as a result of the draft force applied through the links, bracing means interconnecting the implement frame and the vertical member for opposing the torque exerted on the member about said fulcrum, so that the top link is moved forwardly in proportion to the draft force, said bracing means including a compound toggle for rigid bracing in the face of normal operating forces but which collapses when subjected to overload, said toggle including a spring for biasing the compound toggle into a near dead center operating position and for restoring it to the operating position after the overload is released, the collapse of said toggle allowing the torque exerted on the member to move the top link rearwardly and initiate lowering of the draft links to lighten the load on the tractor rear wheels.

5. A hitch for connecting an implement frame with a tractor comprising a pair of trailing draft links, and a power lift mechanism for the draft links, which power lift mechanism includes a spring-biased top link and means controlled thereby for raising and lowering the draft links in accordance with movements of the top link within a given range and for releasing the draft links when the top link is moved inwardly beyond said range, a vertical member having means adjacent its upper end for connection to the top link and means adjacent its lower end for pivotal connection to the draft links, means pivotally connecting said vertical member to the implement frame for pivotal movement in a fore-and-aft direction, bracing means interposed between the implement frame and said vertical member preventing relative pivoting movement between them under normal operating conditions, said bracing means including a collapsible element arranged to collapse when subjected to predetermined pressure, said implement frame connection to said vertical member being located at a point vertically spaced from the connection of the member to the draft links so that the draft force applied by the draft links exerts a torque on the member, said element being operative to resist said torque until the draft force exceeds a predetermined value and effects the collapse of the element and movement of the top link for conditioning the power lift mechanism for lowering the draft links thereby releasing the load on the tractor rear wheels.

6. A hitch as defined in claim 5 in which the point of connection between the implement frame and the vertical member is located below the connection of the member with the draft links.

References Cited in the file of this patent

UNITED STATES PATENTS

| | | |
|---|---|---|
| 1,030,282 | Clancy | June 25, 1912 |
| 2,118,180 | Ferguson | May 24, 1938 |
| 2,118,181 | Ferguson | May 24, 1938 |
| 2,440,550 | Martin | Apr. 27, 1948 |
| 2,663,239 | Rapp et al. | Dec. 22, 1953 |